May 1, 1962
C. R. TIDLAND
3,032,288
EXPANSIBLE ROTATABLE MANDREL
Filed April 25, 1960
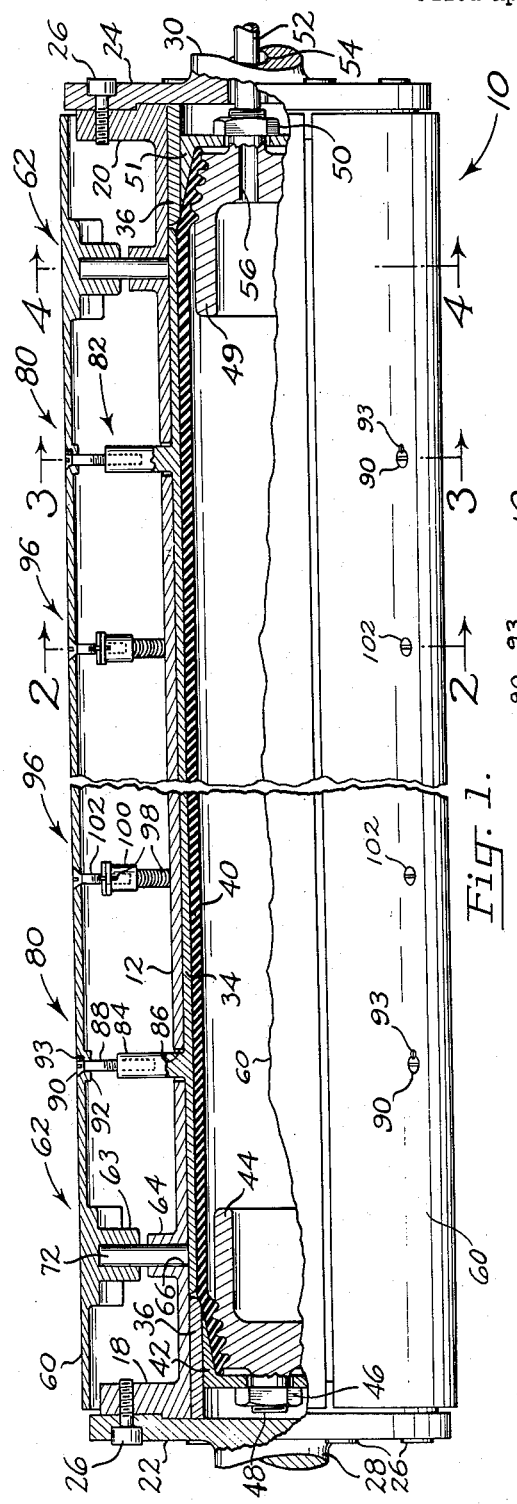
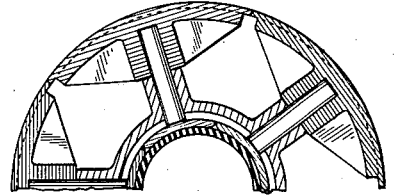
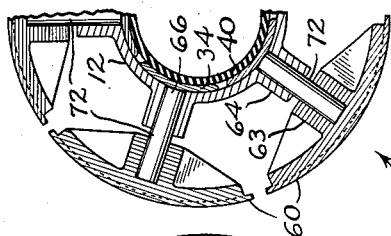
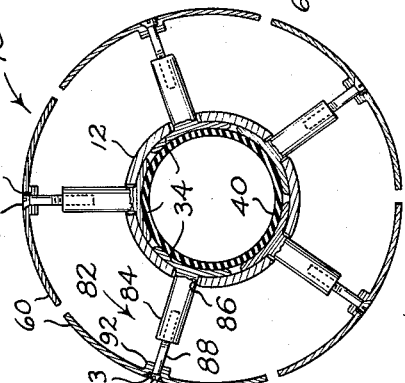
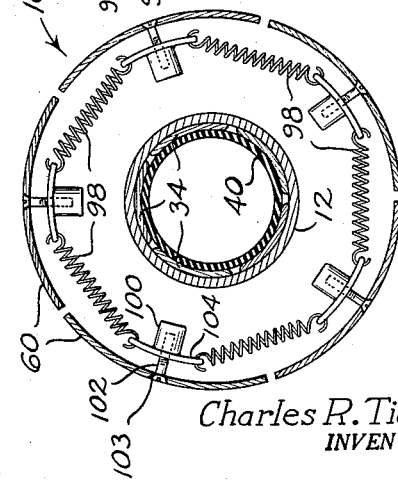
Charles R. Tidland
INVENTOR.
BY Ramsey and Kolisch
Attys.

United States Patent Office 3,032,288
Patented May 1, 1962

3,032,288
EXPANSIBLE ROTATABLE MANDREL
Charles R. Tidland, Box 1014, Camas, Wash., assignor of one-half to Arthur T. Williams, Camas, Wash.
Filed Apr. 25, 1960, Ser. No. 24,493
5 Claims. (Cl. 242—72)

This invention relates to expansible rotatable mandrels, of the type that may be used in the paper or similar industries for the winding or unwinding of a sheet of paper or other flexible material.

Expansible mandrels or shafts have found wide acceptance since by contraction of the shafts they are withdrawn easily from the center of a formed roll, and similarly, they may be inserted easily while contracted into the hollow center of an already formed roll and then expanded firmly to grip the inside of the roll.

A general object of this invention is to provide an improved expansible mandrel fully adjustable between expanded and contracted conditions that also comprises novel structure limiting radial outward movement of the outer gripping surfaces of the mandrel beyond a limit position. Mandrels frequently are rotated at relatively high speeds, and the action of centrifugal force on the outer gripping surfaces of a conventional mandrel tends to urge radial outward shifting of these surfaces to an extent that makes the mandrel unworkable and also dangerous. By this invention, the extent of radial outward shifting is fixed, regardless of the speeds at which the mandrel is rotated.

Another object of the invention is to provide an improved construction for an expansible mandrel wherein the outer gripping surfaces are expelled outwardly by compression pins interposed between the gripping surfaces and expansible mechanism within the mandrel, and wherein the means limiting radial outward movement comprises novel tension links interspersed with these compression pins connecting the gripping surfaces and expansible mechanism.

A related object is to provide such a mandrel wherein the pins are slidable in sleeve portions connected to a central tube in the mnadrel and to the outer gripping surfaces, such sleeve portions seating the pins and subjecting them to shear when torque is applied to the central tube, the pins in this way protecting the link means in the mandrel limiting extension from shearing stresses. It is a feature of the invention that such sleeves limit radial inward movement of the gripping surfaces.

A further object of the invention is to provide such an expansible mandrel which further includes novel biasing mechanism operable automatically to urge radial inward movement of the gripping surfaces.

Another object of the invention is to provide a mandrel of the expansible type which is easily disassembled and then reassembled for repair purposes. In the construction contemplated the gripping surfaces are evenly balanced about a central rigid tube, and the tension links and springs of the biasing mechanism may be detached by adjusting screw parts exposed to the outside of the mandrel. The compression pins discussed are loose and fall apart easily.

Other objects and features are attained by the invention, the same being described below in conjunction with the accompanying drawings, wherein:

FIG. 1 is a side view of an expansible mandrel, considerably shortened by removing a central portion, constructed according to an embodiment of this invention, and with side portions of the mandrel along its length removed to illustrate interior construction;

FIG. 2 is a section view, taken along the line 2—2 in FIG. 1, showing biasing mechanism included in the mandrel for drawing the outer gripping surface portions inwardly;

FIG. 3 is a section view, taken along the line 3—3 in FIG. 1 illustrating the tension links that are included to limit outward movement of the gripping surfaces;

FIG. 4 is a partial section view, taken along the line 4—4 in FIG. 1, showing the compression pins in the mandrel and their mounting; and FIG. 5 is a view similar to FIG. 4, but showing the parts in a contracted position.

Referring now to the drawings, the mandrel (indicated generally at 10) comprises a central rigid tube or mounting member 12 provided at each of its ends with an annular, radially outwardly projecting flange portion. These are indicated at 18, 20, and provide a means for mounting hub portions 22, 24 at the ends of the mandrel. The hub portions are secured to the flanges by screws 26, and include journal portions 28, 30 projecting axially from the center of the hub portions. The journal portions are for mounting the mandrel, when the same is put in operation, as when winding or rewinding paper.

Within the hollow interior of tube 12, and extending substantially the length thereof, are plural, inner cylindrical segments or members 34. These have a curvature substantially complementing the curvature of the inside of the tube, and are equally circumferentially spaced about the inside of the tube. Between the ends of the segments and hub portions 22, 24 are tubular spacer sleeves 36.

In the central space bounded by the radially inner faces of segments 34 (these faces constituting pressure surfaces) is an elongated pneumatic hose or tube 40. This is closed at its left end in FIG. 1 by a cap 42, and a plug 44 that is drawn within the cap to clamp onto the end of the hose. The cap is tightened on the plug by a nut 46 screwed onto a threaded extension 48 of the plug. In a somewhat similar manner, the opposite end (or the right end) of the hose is closed off by a cap 51 drawn tightly against a plug 49 by a nut 50. Air is supplied to and exhausted from the interior of the hose by means of a pipe 52 which extends through an accommodating bore 54 formed in journal portion 30, and a bore 56 formed in the plug 49 that connects with the interior of pipe 52. The segments 34 and hose 40 constitute expansible mechanism within the mandrel, and the hose itself inflatable means for urging the inner segments against the inside of tube 12. In FIG. 4 the mandrel is shown in an expanded condition, and it will be noted that segments 34 are flush against the inner surface of tube 12. In FIG. 5 the parts are in a contracted condition, and segments 34 have moved radially inwardly, with the hose partially collapsed.

The contacting or gripping surfaces of the mandrel are provided by plural outer elongated cylindrical segments 60 extending the length of the mandrel between hub portions 22, 24. Each of these is directly radially outwardly of and mates with one of the inner segments 34. As will be described, these outer segments are connected to the inner segments in such a manner that radial inward and outward movement of segments 60 is limited. The connection also provides a means for transmitting rotation of the tube to the outer segments, and for producing outward movement of segments 60 on outward movement of segments 34.

Specifically, spaced at regular modules along the length of the mandrel (in a typical construction a spacing of from 8 to 15 inches may be used for mandrels about 12 feet in length) are banks 62 of mating pairs of sleeve or socket portions, indicated individually at 63 and 64. One pair of sleeve portions is provided each mating pair of segments 34, 60. Outer sleeve portion 63 is secured to the inside of an element 60, and inner sleeve portion 64 is secured to the outside of tube 12. The center bore or recess of sleeve 63 faces radially inwardly, and is aligned with the center bore of sleeve 64. Tube 12 is provided with a port or aperture 66 that connects with the center bore of each sleeve 64. Snugly fitted within the interiors of each pair of sleeve portions is a slidable compression pin or member 72. This extends through port 66 and has its inner end in contact with an inner segment 34.

The pairs of sleeve portions and pins serve several purposes in the construction. The pins themselves constitute compression members forcing segments 60 outwardly on outward movement of segments 34. The sleeve portions constitute lug means limiting radial inward movement of the outer segments past a position where the outer segments form substantially a perfect cylinder, since their adjacent ends come into contact with the outer segments in this position. Where the center tube 12 is a driven part, the pins are subjected to a shearing force along portions intermediate adjacent ends of the sleeve portions, and function to transmit rotation of the tube to the outer segments 60.

Interspersed with the banks 62 of the sleeve portions are banks 80 of nonyielding tension links, indicated individually at 82. In each bank, one tension link is provided each mating pair of inner and outer segments. Ordinarily the banks of links may be spaced apart a distance approximately twice the distance between adjacent banks of sleeve portions. With reference now particularly to FIGS. 1 and 3, each tension link comprises an internally threaded sleeve or body portion 84 joined, as by welding to the outer face of an inner segment. Portion 84 projects radially outwardly through a port 86 formed in the tube toward the outer segment. Screwed into the internally threaded portion is a screw part 88 having a head 90 exposed to the outside of the mandrel and seating within a recess 91. Screw part is locked from turning by a lock screw 93. A backing washer 92 may be welded to the inside of the outer segment to add strength at the location of recess 91 receiving the head of the screw part.

Ordinarily each screw part 88 is turned in sufficiently to bring the mating inner and outer segments which it links together as close together as compression pins 72 permit. The links are tensioned by centrifugal force tending to throw segments 60 outwardly, but since they are unyielding, outward movement is limited. Pins 72 protect the tension links from having shear applied thereto.

In each link, the connection of each portion 84 to an inner segment and the connection of each screw head with a outer segment constitutes means anchoring the inner end of the link against relative movement radially outwardly of the inner segment, and means anchoring the outer end of the link against relative movement radially inwardly of the outer segment, respectively.

Biasing mechanism present in the construction urges the outer segments radially inwardly to their radial inner limit position (determined by the ends of mating sleeve portions engaging and shown in FIG. 5). Specifically, and referring to FIGS. 1 and 2, provided at intervals along the length of the mandrel and interspersed with banks 62, 80 are banks 96 of coil tension springs, indicated individually at 98. In ordinary constructions, relatively few of such banks are necessary, and two may suffice although more may be included if desired. Each bank includes an elongated spring 98 joining each outer segment to each outer segment adjacent thereto. Considering the mounting for the springs, supported on the inside of each outer segment is a spring anchor 100. Each has an internally threaded bore which receives an adjusting screw 102. This adjusting screw, as in the case of screws 88, has a head seating within a recess 103 and exposed to the outside of the mandrel. Springs 98 have ends that are connected to lug portions 104 of anchors 100. Spring pressure is adjusted by turning the exposed heads of screws 102, which produces movement in a radial direction of anchors 100.

Describing the operation of the expansible mandrel, when the central hose 40 is deflated, springs 98 draw together, and this is accompanied by radial inward movement of the outer segments, and radial inward shifting of the pins 72, and contraction of inner segments 34. Radial inward movement is limited in the manner already described. To expand the mandrel, the hose is inflated, which causes the inner segments to move to the position in FIG. 4. This movement is transmitted by pins 72 to the outer segments, causing them to shift outwardly. Outward movement of segments 60 is accompanied by expansion of tension springs 98, and limited by the links described.

A feature of the invention is that the mandrel is easily disassembled and afterwards reassembled in case repair is necessary. The slidable compression pins seated within the sleeves offer no resistance to complete removal of the outer segments from the mandrel. To remove an outer segment, it is only necessary to loosen and remove screws 102 and 88 holding the spring anchors and forming part of the tension links, respectively.

It is claimed and desired to secure by Letters Patents:

1. An expansible rotatable mandrel comprising a central rigid tube, inner elongated cylindrical segments extending longitudinally of the tube substantially complementing the curvature of and circumferentially spaced about the inside of said tube, inflatable means within the tube for urging said segments against the inside of the tube, outer elongated cylindrical segments extending longitudinally of the tube circumferentially spaced about the outside of the tube, each of said outer segments being radially outwardly of and mating with one of said inner segments, plural radially extending sleeve portions joined to the outside of the tube and spaced along the length of each pair of mating segments and an aperture formed in the tube wall connecting with the interior of each sleeve portion, compression pins fitted within the sleeve portions projecting through the apertures and with inner ends detachable from and abutting the outer faces of the inner segments, means seating the outer ends of the pins on the inner faces of the outer segments, a set of apertures formed in the tube wall interspersed with said sleeve portions, and tension link means extending through said last-mentioned set of apertures joined at their inner ends to said inner segments and their outer ends to said outer segments.

2. An expansible rotatable mandrel comprising a central rigid tube, outer elongated cylindrical segments extending longitudinally of the tube and circumferentially spaced about the outside of the tube, a first set of radially extending sleeve portions joined to the inside of each outer segment and spaced along its length, a mating set of rapidly extending sleeve portions joined to the outside of the tube and engageable with the first set to limit inward movement of the segment, a first set of apertures formed in the tube wall connecting with the interiors of the mating set of sleeve portions, a compression pin with an outer end seated within each sleeve portion of the first-mentioned set and extending through the sleeve portion mated therewith and the aperture connecting with the sleeve portion, elongated members circumferentially spaced about the inside of the tube, one mating with each outer segment, bearing against but disconnected from the inner ends of said compression pins, means within the tube for urging said elongated members against the inside of the tube, a second set of apertures formed in the tube wall interspersed with said first set of apertures, and tension link means extending through said second set of apertures joined at their inner ends to said elongated members and their outer ends to said outer segments, each tension link means having an outer end portion that is detachable from the elongated member to which the tension link means is joined from outside the mandrel, each elongated member together with any portions of the various link means joined thereto that remain after detachment of said outer end portions having a size that fits within the interior of said tube.

3. In an expansible mandrel comprising an elongated hollow mounting member, plural pairs of elongated segments, each pair including an inner segment and a mating outer segment, both of which extend longitudinally of said mounting member, with the inner segment inside and the outer segment outside said mounting member, and means within said mounting member for urging the inner segments against the inside of said mounting member, the improvement comprising, for each pair of segments, a first set of apertures in the wall of said hollow mounting member spaced along the length thereof, elongated compression members extending between the inner and outer segments and through said apertures with inner ends bearing upon and detachable from the inner segment and outer ends against the outer segment, a second set of apertures in the wall of said hollow mounting member interspersed with the first set of apertures and spaced along the length of the mounting member, and tension link means extending through said second set of apertures and joined at their inner ends to the inner segment and their outer ends to the outer segment.

4. In an expansible mandrel comprising an elongated hollow mounting member, plural pairs of elongated segments, each pair including an inner segment and a mating outer segment, both of which extend longitudinally of said mounting member, with the inner segment inside and the outer segment outside said mounting member, and means within said mounting member for urging the inner segments against the inside of said mounting member, the improvement comprising, for each pair of segments, a first set of apertures in the wall of said hollow mounting member spaced along the length thereof, elongated compression members extending between the inner and outer segments and through said apertures with inner ends bearing upon and detachable from the inner segment and outer ends against the outer segment, a second set of apertures in the wall of said hollow mounting member interspersed with the first set of apertures and spaced along the length of the mounting member, and tension link means extending through said second set of apertures and joined at their inner ends to the inner segment and their outer ends to the outer segment, each tension link means having an outer end portion that is detachable from the inner segment from outside the mandrel, the inner segment together with any portions of the various link means joined thereto that remain after detachment of said outer end portions having a size that fits within the interior of said hollow mounting member.

5. In an expansible mandrel comprising an elongated hollow mounting member, plural pairs of elongated segments, each pair including an inner segment and a mating outer segment, both of which extend longitudinally of said mounting member, with the inner segment inside and the outer segment outside said mounting member, and means within said mounting member for urging the inner segments against the inside of said mounting member, the improvement comprising, for each pair of segments, a first set of apertures in the wall of said hollow mounting member spaced along the length thereof, elongated compression pins extending between the inner and outer segments and through said apertures with inner ends bearing upon but disconnected from the inner segment and outer ends bearing upon but disconnected from the outer segment, means joined to the outer segment seating the outer ends of said pins, a second set of apertures in the wall of said hollow mounting interspersed with the first set of apertures, and tension link means extending through said second set of apertures joined at their inner ends to the inner segment and their outer ends to the outer segment, each tension link means having an outer end portion that is detachable from the inner segment by means accessible from outside the mandrel, and the inner segment together with any portions of the link means joined thereto that remain after detachment of said outer end portions having a size that fits within the interior of said hollow mounting member.

References Cited in the file of this patent
UNITED STATES PATENTS

| | | |
|---|---|---|
| 2,537,492 | Tidland | Jan. 9, 1951 |
| 2,558,689 | Miller | June 26, 1951 |
| 2,727,700 | Van Colle et al. | Dec. 20, 1955 |
| 2,909,338 | Cozzo | Oct. 20, 1959 |
| 2,950,071 | Tidland | Aug. 23, 1960 |